United States Patent
Mukawa (10) Patent No.: US 7,286,272 B2
(45) Date of Patent: Oct. 23, 2007

(54) IMAGE DISPLAY UNIT

(75) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 10/512,037

(22) PCT Filed: Apr. 22, 2003

(86) PCT No.: PCT/JP03/05110

§ 371 (c)(1),
(2), (4) Date: Oct. 20, 2004

(87) PCT Pub. No.: WO03/091783

PCT Pub. Date: Nov. 6, 2003

(65) Prior Publication Data

US 2005/0140644 A1    Jun. 30, 2005

(30) Foreign Application Priority Data

Apr. 25, 2002   (JP) ............................ 2002-124824

(51) Int. Cl.
*G03H 1/00* (2006.01)

(52) U.S. Cl. ........................ 359/13; 359/14; 359/15; 359/630; 359/631; 345/7; 345/9

(58) Field of Classification Search ............ 359/13–16, 359/630, 631, 633; 345/7–9
See application file for complete search history.

(56) References Cited

U.S. PATENT DOCUMENTS

| | | | | |
|---|---|---|---|---|
| 4,688,879 | A * | 8/1987 | Fairchild | 340/908 |
| 5,396,349 | A * | 3/1995 | Roberts et al. | 359/14 |
| 5,999,282 | A * | 12/1999 | Suzuki et al. | 359/20 |
| 6,636,356 | B2 * | 10/2003 | Takeyama | 359/565 |
| 7,205,960 | B2 * | 4/2007 | David | 345/7 |
| 2002/0021498 | A1 | 2/2002 | Ohtaka et al. | |
| 2002/0060850 | A1 * | 5/2002 | Takeyama | 359/630 |
| 2003/0086135 | A1 * | 5/2003 | Takeyama | 359/13 |
| 2004/0109208 | A1 * | 6/2004 | Amanai et al. | 359/13 |

FOREIGN PATENT DOCUMENTS

| | | |
|---|---|---|
| JP | 2001-311904 | 11/2001 |
| JP | 2002-98929 | 4/2002 |

* cited by examiner

*Primary Examiner*—Leonidas Boutsikaris
(74) *Attorney, Agent, or Firm*—Sonnenschein Nath & Rosenthal LLP (57) ABSTRACT

The present invention relates to an image display device in which a virtual image of an image display element is formed to display an image. The image display device includes a transmission type diffraction optical element (50) for diffracting exit lights from the image display element (20) and a reflection type optical element (70) having a positive optical power for reflecting the diffracted lights from the transmission type diffraction optical element (50). When the reflected lights reflected by the reflection type optical element (70) are incident again on the transmission type diffraction optical element (50), the transmission type diffraction optical element (50) diffracts the reflected lights with a diffraction efficiency lower than a diffraction efficiency for the exit lights from the image display element (20).

38 Claims, 8 Drawing Sheets

IMAGE DISPLAY UNIT

BACKGROUND OF THE INVENTION

The present invention relates to an image display device preferably used for a view finder of a video camera or a head mounted type display or the like, and more particularly to a glasses type virtual image display device having a see-through function.

This application of the invention claims a priority based on Japanese Patent Application No. 2002-124824 filed in Apr. 25, 2002 in Japan. The earlier application is applied to this application by referring thereto.

An image display device used as a view finder of a video camera or a head mounted type display or the like has been hitherto proposed. As such an image display device, a virtual image display device formed by using a reflection type spatial light modulator is proposed.

Figure 1:
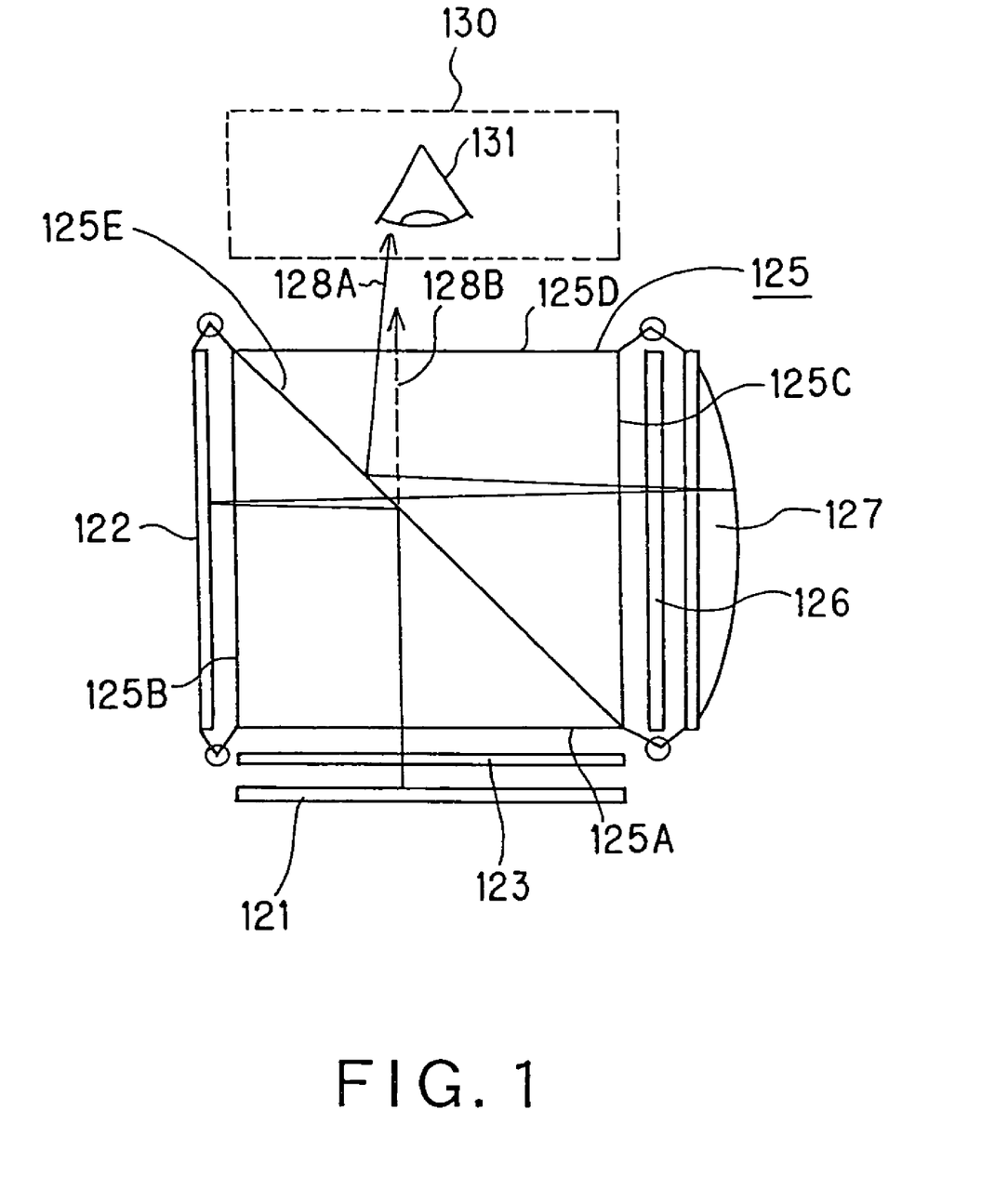
FIG. 1 is a side view showing a usual image display device.

As one example of this kind of image display device, an image display device is disclosed in the description of U.S. Pat. No. 5,596,451. The image display device described in this description has a polarized beam splitter cube 125 of a cubic form as shown in FIG. 1. The polarized beam splitter cube 125 has a polarized beam splitter surface 125E on a diagonal surface.

This image display device has an illuminating light source device 121 and a polarizer 123 opposed to a first surface 125A of the polarized beam splitter cube 125 which is disposed at an angle of 45° relative to the polarized beam splitter surface 125E. A reflection type spatial light modulator 122 is opposed to a second surface 125B of the polarized beam splitter cube 125 which is disposed at an angle of 45° relative to the polarized beam splitter surface 125E and at an angle of 90° relative to the first surface 125A. A quarter-wave plate 126 and a reflection mirror 127 are opposed to a third surface 125C of the polarized beam splitter cube 125 which is parallel to the second surface 125B.

In the image display device, beams of light emitted from the illuminating light source device 121 penetrate the polarizer 123, so that the beams become linearly polarized beams as S polarized beams relative to the polarized beam splitter surface 125E. The polarized beams are reflected on the polarized beam splitter surface 125E and polarized by 90° and the polarized beams reach the reflection type spatial light modulator 122. The reflected beams in which the polarized states are modulated in accordance with a display image are emitted from the reflection type spatial light modulator 122.

P polarized components of the reflected beams relative to the polarized beam splitter surface 125E penetrate the polarized beam splitter surface 125E, pass through the quarter-wave plate 126 and are reflected on the concave reflection surface of the reflection mirror 127. The reflected beams in the reflection mirror 127 pass through the quarter-wave plate 126 again, so that the reflected beams become S polarized beam relative to the polarized beam splitter surface 125E. The reflected beams 128A that reach the polarized beam splitter surface 125E are reflected by the polarized beam splitter 125E and polarized by 90°, reach the pupil 131 of a human being and are observed in an observation area 130.

Figure 2:
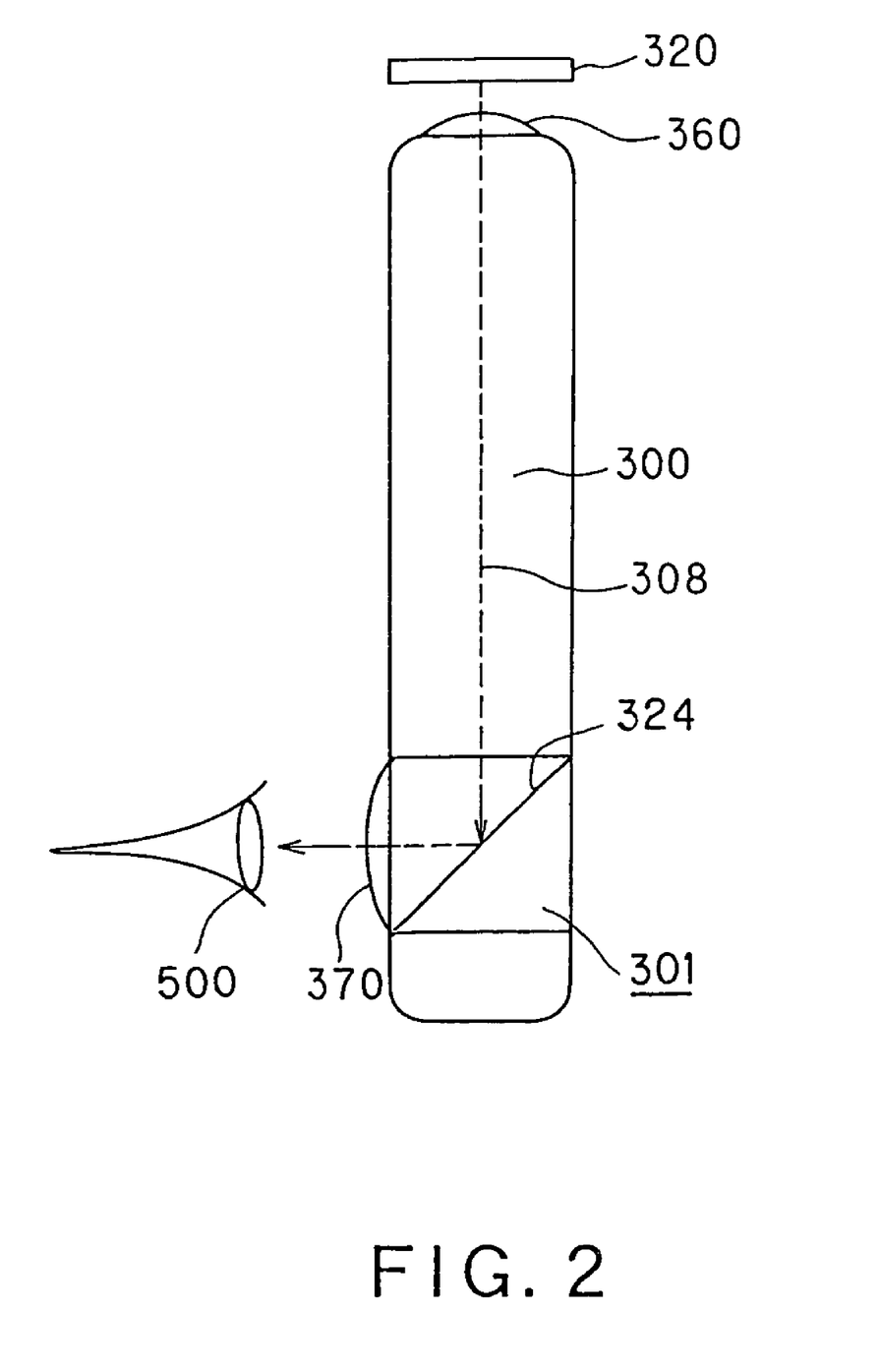
FIG. 2 is a side view showing another usual image display device.

As another example of the image display device, an image display device is disclosed in the description of U.S. Pat. No. 5,886,822. The image display device described in this description has, as shown in FIG. 2, a polarized beam splitter cube 301 having a cubic form like the above-described image display device. The polarized beam splitter cube 301 has a polarized beam splitter surface 324 on a diagonal surface.

In the image display device, an optical wave guide 300 made of an optical medium is provided on a first surface of the polarized beam splitter cube 301 disposed at an angle of 45° relative to the polarized beam splitter surface 324 to optically come into tight contact with the polarized beam splitter cube 301. At the terminal end part of the optical wave guide 300, a first lens 360 is disposed to optically come into tight contact with the optical wave guide 300. Further, an image display element 320 is opposed to the first lens 360.

In this image display device, image display beams 308 outgoing from the image display element 320 are incident on the optical wave guide 300 through the first lens 360, reflected on the polarized beam splitter surface 324, and then, emitted through a second lens 370 and reach the pupil 500 of an observer. In this image display device, a virtual image is formed by the first and second lenses 360 and 370.

In this image display device, since a large physical distance can be provided between the image display element and the virtual image forming lens, the image display element does not need to be provided just in front of the eyes of an observer. The degree of freedom in design is advantageously large.

Figure 3:
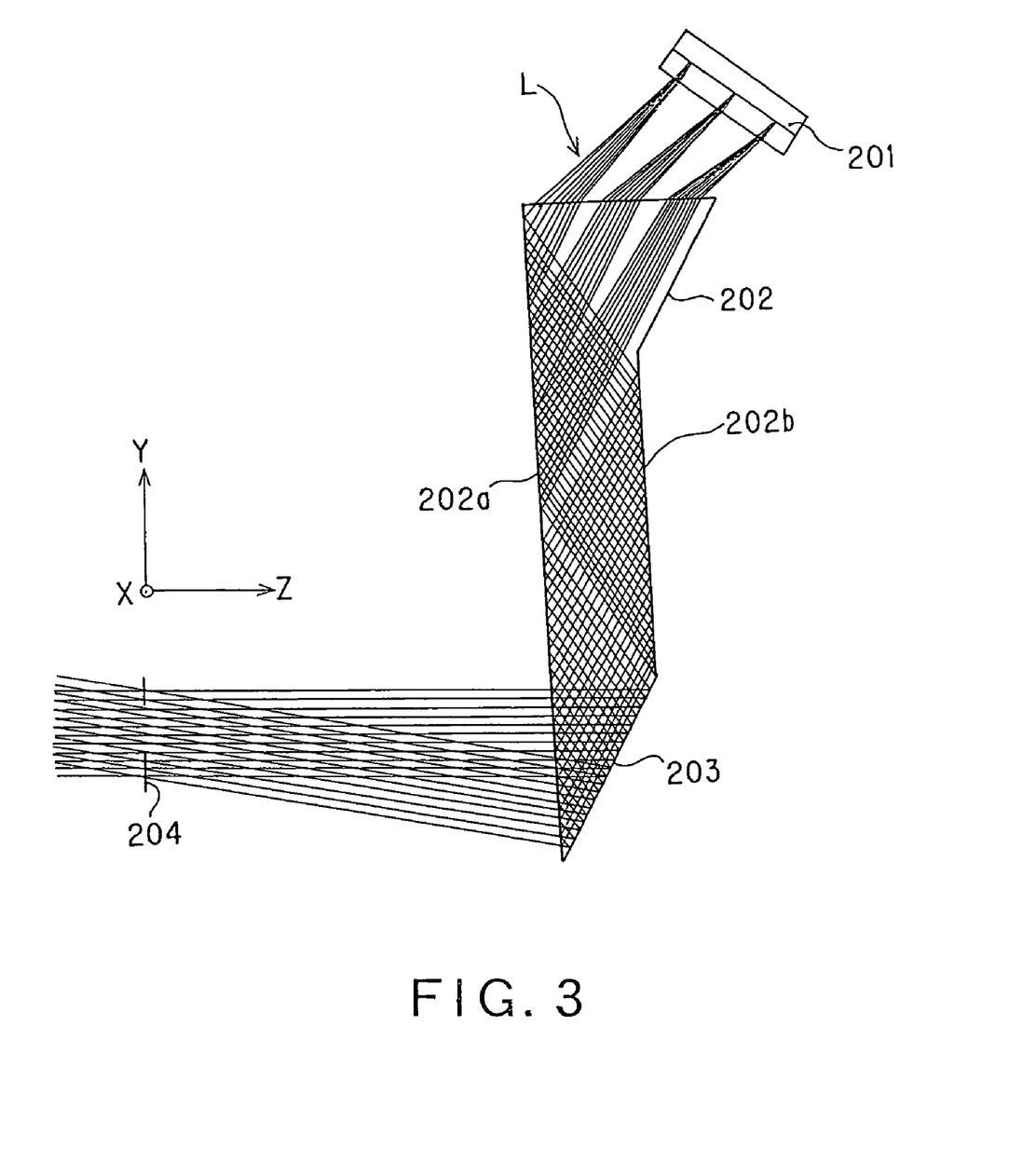
FIG. 3 is a side view showing a still another usual image display device.

As a still another example of the image display device, an image display device is disclosed in Japanese Patent Application Laid-Open No. 2001-264682. In the image display device described in the publication, as shown in FIG. 3, display lights L emitted from an image display element 201 are allowed to be incident on a prism 202. The display lights are allowed to be reflected a plurality of times between two reflecting surfaces 202a and 202b opposed to each other in this prism 202 and to be guided to an enlarging lens. The image display element 201 in the image display device serves to modulate intensity.

As the enlarging lens, a reflection type hologram lens 203 is employed. The reflection type hologram lens 203 forms a virtual image. That is, in the image display device, the display lights L emitted from the image display element 201 are incident on the prism 202, and then, internally reflected a plurality of times between the two opposed reflecting surfaces 202a and 202b. Then, the display lights L to which the reflection type hologram lens 203 gives a power for forming the virtual image are emitted from the prism 202 and reach the pupil 204 of an observer.

In this image display device, while the display lights repeat an internal reflection in the prism, the display lights are transmitted to the enlarging lens. Therefore, the image display device can conveniently decrease the thickness of an optical system more than the image display device shown in FIG. 2.

In the above-described image display devices, the image display device shown in FIG. 1 has such problems as described below.

Initially, the beams from the illuminating light source device 121 partly pass through a fourth surface 125D of the polarized beam splitter cube 125 as stray beam 128B as shown by broken lines in FIG. 1 and reach the pupil 131. The stray beams 128B constitute noise for image data displayed by the reflection type spatial light modulator 122 and deteriorate the contrast of the displayed image.

In the optical system of the image display device shown in FIG. 1, the maximum value of an exit pupil diameter or a display angle of view of the optical system is restricted depending on the size of the polarized beam splitter cube 125 for polarizing the reflected beams 128A for displaying an image toward the pupil 131 side. In the image display device, in order to increase a value such as the maximum value of the exit pupil diameter or the display angle of view while a constant eye relief is maintained, the polarized beam splitter cube 125 needs to be enlarged. When the polarized beam splitter cube 125 is enlarged, the thickness of all the optical system is inconveniently increased and the weight is also increased.

The polarized beam splitter cube 125 forming the image display device shown in FIG. 1 is hardly produced and a production cost thereof is high. Accordingly, the manufacture of the entire image display device is difficult and the manufacture cost thereof is undesirably increased.

The image display device shown in FIG. 2 has such problems as described below.

Initially, the image display device shown in FIG. 2 has a structure that the maximum value of an exit pupil diameter or a display angle of view of an optical system is restricted depending on the size of the polarized beam splitter cube 301 for reflecting the image display beams 308. In this image display device, in order to increase a value such as the maximum value of the exit pupil diameter or the display angle of view while a constant eye relief is maintained, the polarized beam splitter cube 301 and the optical wave guide 300 need to be enlarged. When the polarized beam splitter cube 301 and the optical wave guide 300 are enlarged, the thickness of all the optical system is inconveniently increased and the weight is also increased.

The polarized beam splitter cube forming the image display device is hardly produced and a production cost thereof is high. Accordingly, the manufacture of the entire image display device is difficult and the manufacture cost thereof is undesirably increased.

The image display device shown in FIG. 3 has such problems as described below.

The image display device shown in FIG. 3 uses a decentered optical system which is more suitable for a thin structure than the image display devices using coaxial optical systems shown in FIGS. 1 and 2. However, the reflection type hologram lens 203 can not be arranged so as to be parallel to the pupil 204 not to increase an aberration, that is, cannot be arranged so as to be perpendicular to the optical axis of the pupil 204. Accordingly, in the image display device, in order to increase the exit pupil diameter or the display angle of view of the optical system, the thickness of the prism 202 is increased and the weight is also increased.

In the optical system forming the image display device shown in FIG. 3, the reflection type hologram lens 203 on which the image display lights are incident and that is inclined with respect to the optical axes of the image display lights has the power for forming the virtual image. That is, this optical system is the decentered optical system.

A quantity of eccentricity in this optical system, that is, the angle of incidence or the angle of emergence of the image display lights to the reflection type hologram lens 203 is an angle exceeding 10° in a medium forming the prism 202. In the optical system having such a quantity of eccentricity, an enormous quantity of eccentric aberration is generated. It is difficult only for the reflection hologram lens 203 to correct the eccentric aberration.

In this image display device, a high resolving power, for instance, an MTF (Modulation Transfer Function) not lower than 20% cannot be ensured for a spatial frequency of 50 lines/mm.

SUMMARY OF THE INVENTION

It is an object of the present invention to provide a new image display device that can solve problems of a usual image display device.

It is another object of the present invention to provide an image display device for forming a virtual image of an image display element and displaying an image, in which the thickness of an optical system is decreased, its weight is reduced and an entire device can be made compact and its weight can be reduced.

It is a still another object of the present invention to provide an image display device in which an exit pupil diameter, a display angle of view and an eye relief can be increased while an entire device can be made compact and its weight can be reduced and an aberration is reduced.

An image display device according to the present invention proposed to realize the above-described objects comprises an image display element, a transmission type diffraction optical element for diffracting exit lights from the image display element and a reflection type optical element having a positive optical power for reflecting the diffracted lights from the transmission type diffraction optical element. When the reflected lights reflected by the reflection type optical element having the positive optical power are incident again on the transmission type diffraction optical element, the transmission type diffraction optical element forming the image display device diffracts the reflected lights with a diffraction efficiency lower than a diffraction efficiency for the exit lights from the image display element.

An image display device according to the present invention comprises an image display element, a transmission type diffraction optical element for receiving exit lights from the image display element and a reflection type optical element having a positive optical power for reflecting the exit lights from the image display element which pass through the transmission type diffraction optical element without being diffracted in the transmission type diffraction optical element. When the reflected lights reflected by the reflection type optical element having the positive optical power are incident again on the transmission type diffraction optical element, the transmission type diffraction optical element diffracts the reflected lights with a diffraction efficiency higher than a diffraction efficiency for the exit lights from the image display element.

In the image display device according to the present invention, as the transmission type diffraction optical element, a holographic polymer dispersed liquid crystal (HPDLC) optical element that mainly diffracts P polarized incident lights and hardly diffracts S polarized incident lights is desirably used. At the same time, since the polarized directions of image display lights incident on the HPDLC optical element are different by 90° from those of the reflected lights reflected by the reflection optical element and incident again on the HPDLC optical element, a quarter-wave plate is desirably disposed between the HPDLC optical element and the reflection optical element.

The transmission type diffraction optical element has a function for correcting an eccentric aberration generated in the image display lights that are eccentrically incident from the image display element on the reflection type optical element having the positive optical power. Accordingly, the forms and spaces of diffraction gratings forming the transmission type diffraction optical element are uneven.

In the present invention, an optical medium having a refractive index larger than 1 is disposed in an optical path between the image display element and the transmission type diffraction optical element. Thus, the length of the optical path between the image display element and the transmission type diffraction optical element in terms of air can be decreased and an effective focal length to the reflection type optical element having the positive optical power can be decreased. Consequently, the enlargement magnification of an optical system can be increased and the size of the optical system can be cut down.

The image display device according to the present invention has an arrangement structure that the image display element and the reflection type optical element having the positive optical power are optically eccentrically arranged. Thus, an entire optical system can be realized, which is thinner and lighter than an optical system of other system having the same exit pupil diameter and display angle of view. The image display device according to the present invention has a decentered optical system so that the transmission type diffraction optical element can correct the generated eccentric aberration and the optical system high in its resolving power can be realized.

Still other objects of the present invention and specific advantages obtained by the present invention will become more apparent from the explanation of embodiments described below by referring to the drawings.

DETAILED DESCRIPTION OF THE PRESENTLY PREFERRED EMBODIMENTS

Now, an image display device according to the present invention will be described below by referring to the drawings.

Figure 4:
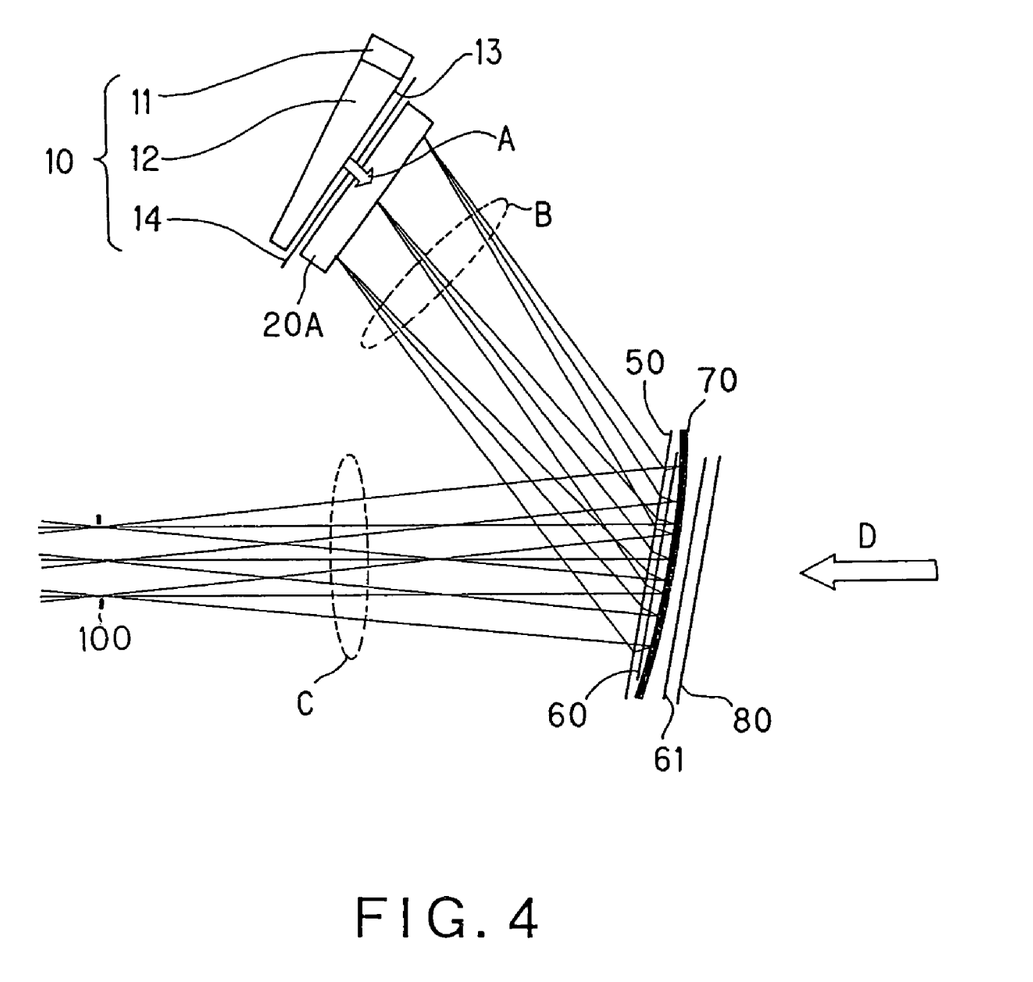
FIG. 4 is a side view showing an image display device according to the present invention.

The image display device according to the present invention includes, as shown in FIG. 4, an illuminating light source device 10, a transmission type spatial light modulator 20A, an HPDLC optical element 50 as a transmission type diffraction optical element, two quarter-wave plates 60 and 61, an adjustable curved face semi-transmission mirror 70 as a reflection type optical element having a positive optical power and a polarizing plate 80.

The light source device 10 uses a semiconductor laser 11 as a light source. The light source device 10 includes a light guide plate 12 for guiding a light flux emitted from the semiconductor laser 11 and an optical film 14. Lights emitted from the semiconductor laser 11 are incident on the light guide plate 12 made of a synthetic resin. The lights with illumination intensity uniformed and angle of emergence controlled by the light guide plate 12 exit from an exit surface 13. Illuminating lights A outgoing from the exit surface 13 pass through the optical film 14 disposed in parallel with the exit surface 13. Thus, the angle of emergence of the lights is further controlled, and then, the lights are incident on the transmission type spatial light modulator 20A. A reflection sheet not shown in the drawing is provided on each surface of the light guide plate 12 except the exit surface 13.

The illuminating lights A incident upon the transmission type spatial light modulator 20A in which the intensity of each pixel is modulated in accordance with image information corresponding to a displayed image by the transmission type spatial light modulator 20A are emitted as image display lights B. As the transmission type spatial light modulator 20A, for example, a liquid crystal may be used. Here, the image display lights B are determined to be the lights of P polarization relative to the HPDLC optical element 50 on which the image display lights B are subsequently incident.

The image display lights B are subsequently incident on the transmission type HPDLC optical element 50 at an angle of incidence of about 45°. This HPDLC optical element 50 is a holographic polymer dispersed liquid crystal which is formed so as to mainly diffract incident lights of P polarization and hardly diffract incident lights of S polarization. Accordingly, most of the image display lights B incident on the HPDLC optical element 50 are diffracted and incident substantially perpendicularly to the quarter-wave plate 60.

The HPDLC optical element 50 has a structure such as a diffraction grating in which liquid crystal layers and polymer layers are sequentially arranged in stripes. The HPDLC optical element 50 has either such characteristic to diffract P polarized lights and not to diffract S polarized lights, or such characteristics as to diffract S polarized lights and not to diffract P polarized lights depending on the oriented directions of molecules of the liquid crystal layers.

In the quarter-wave plate 60, the direction of a lag axis is adjusted so that the image display lights B as linearly polarized lights are converted into circularly polarized lights. The image display lights B incident on the quarter-wave plate 60 become the circularly polarized lights and the circularly polarized lights are incident on the adjustable curved face semi-transmission mirror 70. Here, the reflection surface of the adjustable curved face semi-transmission mirror 70 has only one plane of symmetry parallel to the sheet of a drawing in FIG. 4 and is formed to have no rotation symmetry axis inside and outside the plane, what is called a free curved face. Since the adjustable curved face semi-transmission mirror 70 has the positive optical power, the image display lights B are reflected by the adjustable curved face semi-transmission mirror 70 to form a virtual image.

Reflected lights from the adjustable curved face semi-transmission mirror 70, that is, virtual image display lights C are incident again on the quarter-wave plate 60 and pass through the quarter-wave plate 60. Thus, the virtual image display lights C are returned to the linearly polarized lights. At this time, the virtual image display lights C are not the P polarized lights but the S polarized lights relative to the HPDLC optical element 50. Consequently, the virtual image display lights C are rarely diffracted in the HPDLC optical element 50, pass through the HPDLC optical element and are incident on the pupil 100 of an observer.

In the image display device, the image display lights B are diffracted in the HPDLC optical element 50 so that the image display lights B are incident substantially perpendicularly on the adjustable curved fact semi-transmission mirror 70. Therefore, an eccentric aberration generated in a decentered optical system is hardly generated.

On the other hand, background lights D that reach the rear side of the adjustable curved face semi-transmission mirror 70 pass through, as shown in FIG. 4, the polarizing plate 80, the second quarter-wave plate 61, the adjustable curved face semi-transmission mirror 70, the quarter-wave plate 60 and the HPDLC optical element 50 and are incident on the pupil 100 of the observer. The background lights D are not polarized before the background lights D are incident on the polarizing plate 80. However, the background lights D pass through the polarizing plate 80, so that the lights become linearly polarized lights. Then, the linearly polarized lights pass through the second quarter-wave plate 61, so that the linearly polarized lights become circularly polarized lights. Further, the circularly polarized lights pass through the quarter-wave plate 60, so that the circularly polarized lights become linearly polarized lights as S polarized lights relative to the HPDLC optical element 50. In the HPDLC optical element 50, since the S polarized lights are hardly diffracted, the background lights D are not diffracted in the HPDLC optical element 50 and reach the pupil 100 of the observer. In this case, the quantity of light of the background lights D reaching the pupil 100 of the observer depends on a transmittance (for instance, about 50%) in the adjustable curved face semi-transmission mirror 70.

The polarizing plate 80 or the second quarter-wave plate 61 is rotated on an axis perpendicular to each plane so that the quantity of light of the background lights D reaching the pupil 100 can be varied. For instance, the second quarter-wave plate 61 and the quarter-wave plate 60 are arranged so that lag axes of them are perpendicular to each other. Further, the polarizing plate 80 is rotated so that the penetrating lights of the polarizing plate 80 become the P polarized lights relative to the HPDLC optical element 50. Thus, the background lights D are partly diffracted toward the light source device 10 side in the HPDLC optical element 50. Accordingly, the quantity of light of the background lights D incident on the pupil 100 can be reduced to, for instance, about 10%.

Figure 5:
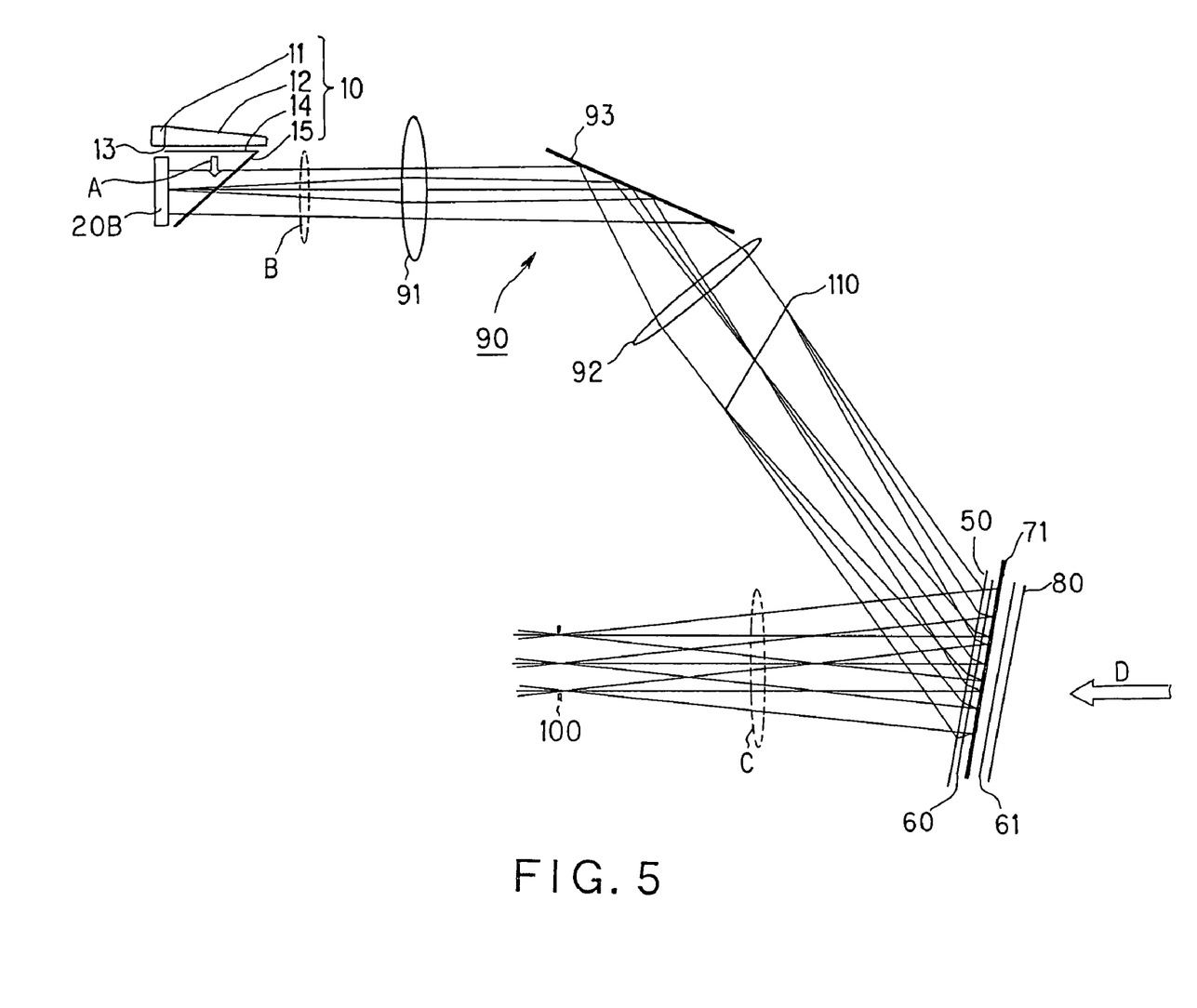
FIG. 5 is a side view showing another embodiment of an image display device according to the present invention.

The image display device according to the present invention may be formed, as shown in FIG. 5, by using a reflection type volume hologram lens 71 in place of the adjustable curved face semi-transmission mirror 70. This image display device includes, as shown in FIG. 5, an illuminating light source device 10, a reflection type spatial light modulator 20B, a relay optical system 90, an HPDLC optical element 50, two quarter-wave plates 60 and 61, the reflection type volume hologram lens 71 and a polarizing plate 80.

The light source device 10 forming the image display device shown in FIG. 5 uses a semiconductor laser 11 as a light source like the image display device shown in FIG. 4. The light source device 10 includes a semiconductor laser 11, a light guide plate 12 for guiding a light flux emitted from the semiconductor laser 11 and an optical film 14. That is, lights emitted from the semiconductor laser 11 are incident on the light guide plate 12 made of a synthetic resin. The lights with illumination intensity uniformed and an angle of emergence controlled by the light guide plate 12 exit from an exit surface 13. Illuminating lights A outgoing from the exit surface 13 pass through the optical film 14 disposed in parallel with the exit surface 13. Thus, the angle of emergence of the lights is further controlled, only S polarized components are mainly reflected by a polarized beam splitter 15, and then, incident on the reflection type spatial light modulator 20B. A reflection sheet not shown in the drawing is provided on each surface of the light guide plate 12 except the exit surface 13.

The illuminating lights A incident upon the reflection type spatial light modulator 20B in which the polarized state of each pixel is modulated in accordance with image information corresponding to a displayed image by the reflection type spatial light modulator 20B are incident again on the polarized beam splitter 15. As the reflection type spatial light modulator 20B, for example, a liquid crystal may be used. The polarized beam splitter 15 mainly transmits P polarized components. Accordingly, the lights whose polarized states are modulated in the reflection type spatial light modulator 20B pass through the polarized beam splitter 15 so that the lights are converted to intensity-modulated image display lights B and the image display lights B are incident on the relay optical system 90.

The relay optical system 90 includes an image forming lens 91, a plane reflecting mirror 93 and a field lens 92. In the relay optical system 90, the image display lights B are initially incident on the image forming lens 91, emitted lights of the image forming lens 91 are incident on the field lens 92 through the plane reflecting mirror 93. The emitted lights of the field lens 92 form an aerial image (real image) 110 of the reflection type spatial light modulator 20B. The image display lights B forming the aerial image 110 are subsequently incident on the transmission type HPDLC optical element 50 at an angle of incidence of about 45°. The HPDLC optical element 50 is a holographic polymer dispersed liquid crystal that is formed to mainly diffract incident lights of P polarization and not to diffract incident lights of S polarization. Here, since the image display lights B incident on the HPDLC optical element 50 are P polarized lights relative to the HPDLC optical element 50, most of the image display lights B incident on the HPDLC optical element 50 are diffracted and incident substantially perpendicularly to the quarter-wave plate 60.

In the quarter-wave plate 60, the direction of a lag axis is adjusted so that the image display lights B as linearly polarized lights are converted into circularly polarized lights. The image display lights B incident on the quarter-wave plate 60 become the circularly polarized lights and the circularly polarized lights are incident on the reflection type volume hologram lens 71. Since the reflection type volume hologram lens 71 has a positive optical power, the image display lights B are reflected by the reflection type volume hologram lens 71 to form a virtual image.

Reflected lights from the reflection type volume hologram lens 71, that is, virtual image display lights C are incident again on the quarter-wave plate 60 and pass through the quarter-wave plate 60. Thus, the virtual image display lights C are returned to the linearly polarized lights. At this time, the virtual image display lights C are not the P polarized lights but the S polarized lights relative to the HPDLC optical element 50. Consequently, the virtual image display lights C are rarely diffracted in the HPDLC optical element 50, pass through the HPDLC optical element 50 and are incident on the pupil 100 of an observer.

In the image display device shown in FIG. 5, the aberration of the image display lights B is corrected in the HPDLC optical element 50 and the reflection type volume hologram lens 71 and an optical path is corrected. The correction of the optical path means the correction of difference in optical path generated between the side of the reflection type volume hologram lens 71 near the relay optical system 90 and the side remote from the relay optical system 90, because the image display lights B are incident slantwise (eccentrically) on the reflection type volume hologram lens 71. When a volume hologram is used, such a difference in the optical path can be corrected.

The HPDLC optical element 50 has an effect of more increasing a quantity of eccentric aberration capable of being corrected than a case in which only the reflection type volume hologram lens 71 is used. In other words, the HPDLC optical element 50 controls the optical path of the image display lights B incident on the reflection type hologram lens 71, so that the HPDLC optical element 50 increases the quantity of eccentric aberration capable of being corrected.

On the other hand, background lights D that reach the rear side of the reflection type volume hologram lens 71 pass through, as shown in FIG. 5, the polarizing plate 80, the second quarter-wave plate 61, the reflection type volume hologram lens 71, the quarter-wave plate 60 and the "HPDLC" optical element 50 and are incident on the pupil 100 of the observer. The background lights D are not polarized before the background lights D are incident on the polarizing plate 80. However, the background lights D pass through the polarizing plate 80, so that the lights become linearly polarized lights. Then, the linearly polarized lights pass through the second quarter-wave plate 61, so that the linearly polarized lights become circularly polarized lights. Further, the circularly polarized lights pass through the quarter-wave plate 60, so that the circularly polarized lights become linearly polarized lights as S polarized lights relative to the "HPDLC" optical element 50. In the "HPDLC" optical element 50, since the S polarized lights are hardly diffracted, the background lights D are not diffracted in the "HPDLC" optical element 50 and reach the pupil 100 of the observer. In this case, the quantity of light of the background lights D reaching the pupil 100 of the observer depends on a transmittance in the reflection type volume hologram lens 71.

The polarizing plate 80 or the second quarter-wave plate 61 is rotated on an axis perpendicular to each plane so that the quantity of light of the background lights D reaching the pupil 100 can be varied. For instance, the second quarter-wave plate 61 and the quarter-wave plate 60 are arranged so that lag axes of them are perpendicular to each other. Further, the polarizing plate 80 is rotated so that the penetrating lights of the polarizing plate 80 become the P polarized lights relative to the HPDLC optical element 50. Thus, the background lights D are partly diffracted toward the light source device 10 side in the HPDLC optical element 50. Accordingly, the quantity of light of the background lights D incident on the pupil 100 can be reduced to, for instance, about 10%.

The image display device shown in FIG. 5 uses the relay optical system 90 to form the aerial image 110. Thus, an effective space between the reflection type spatial light modulator 20B and the reflection type volume hologram lens 71 can be reduced and the optical magnification of a display image can be increased. A curved surface mirror may replace the plane reflecting mirror 93.

Now, a still another embodiment of the image display device according to the present invention will be described by referring to FIG. 6. The image display device shown in FIG. 6 includes an illuminating light source device 10, an illuminating optical system 30, a reflection type spatial light modulator 20B, a light guide prism 40, a transmission type volume hologram optical element 51, a reflection type volume hologram lens 71 and a polarizing plate 80.

Figure 6:
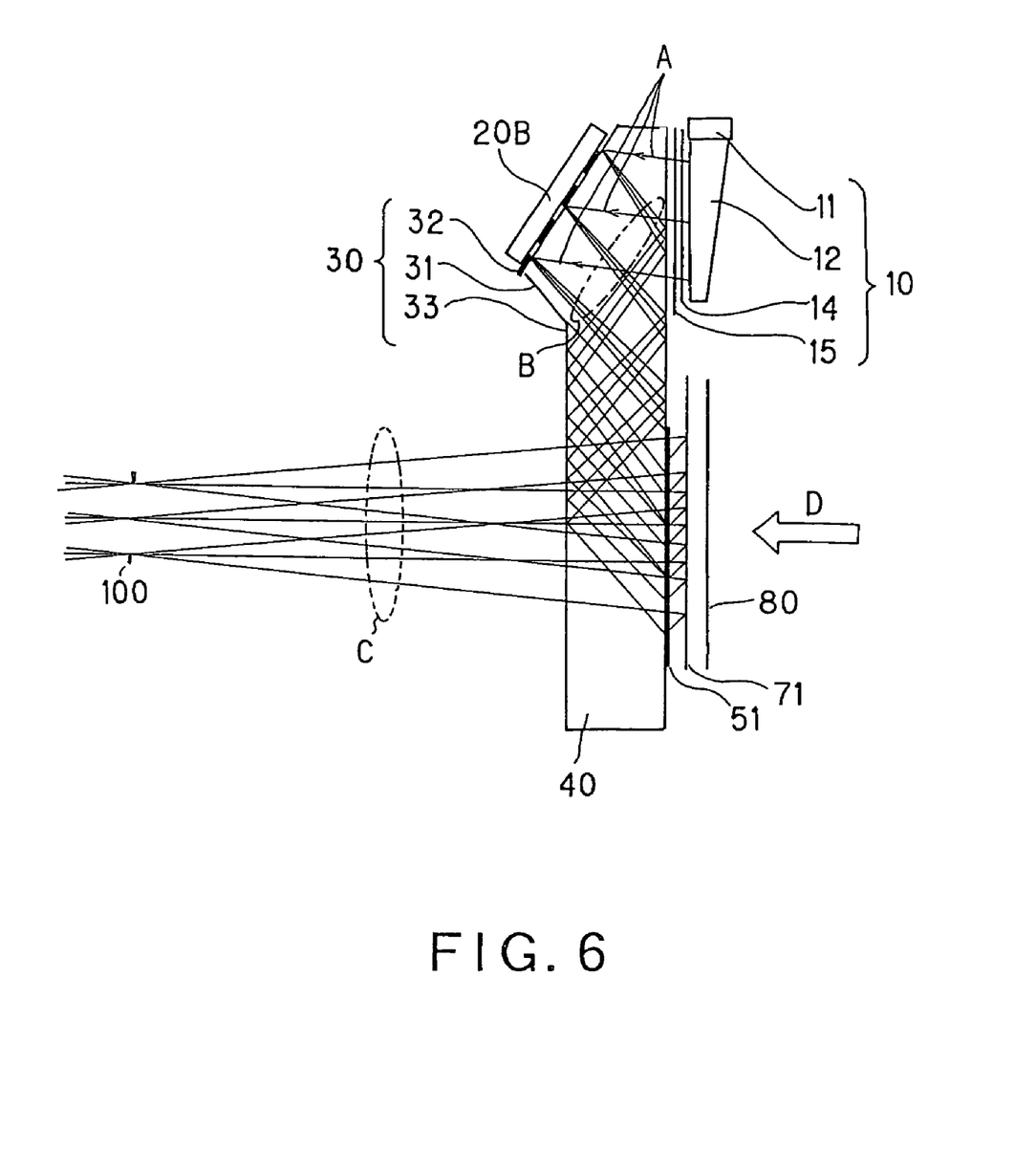
FIG. 6 is a side view showing a still another embodiment of an image display device according to the present invention.

The light source device 10 forming the image display device shown in FIG. 6 uses a semiconductor laser 11 as a light source like the above-described image display device.

The light source device 10 forming the image display device includes a semiconductor laser 11, a light guide plate 12 for guiding a light flux emitted from the semiconductor laser 11 and an optical film 14. Lights emitted from the semiconductor laser 11 are incident on the light guide plate 12 made of a synthetic resin. The lights with illumination intensity uniformed and an angle of emergence controlled by the light guide plate 12 exit from an exit surface 13. Illuminating lights A outgoing from the exit surface 13 pass through the optical film 14 disposed in parallel with the exit surface 13. Thus, the angle of emergence of the lights is further controlled. A reflection sheet not shown in the drawing is provided on each surface of the light guide plate 12 except the exit surface 13.

Illuminating lights A passing through the optical film 14 pass through a polarizing plate 15 so that the illuminating lights become linearly polarized lights. The polarized directions of the illuminating lights A at this time are set to directions for P polarized lights relative to a below-described HPDLC optical element 32. The illuminating lights A that pass through the optical film 14 are incident on an illuminating prism 31 forming the illuminating optical system 30. The illuminating prism 31 has a first surface determined to be a plane of incidence of the illuminating lights A. The illuminating prism 31 has a second surface inclined to the first surface to which the below-described HPDLC optical element 32 and the reflection type spatial light modulator 20B are united. The illuminating prism 31 has a third surface substantially perpendicular to the first surface to which the plane of incidence of the below-described light guide prism 40 is united.

The illuminating lights A incident on the illuminating prism 31 are incident on the HPDLC optical element 32 from the illuminating prism 31. At this time, an angle of incidence of the illuminating lights A in the medium of the illuminating prism 31 relative to the HPDLC optical element 32 is set to about 25°. Since the illuminating lights A incident on the HPDLC optical element 32 are the P polarized lights relative to the HPDLC optical element 32, substantially all the quantity of the illuminating lights is diffracted by the HPDLC optical element 32. The illuminating lights A diffracted by the HPDLC optical element 32 are incident substantially perpendicularly on the reflection type spatial light modulator 20B disposed in the rear part of the HPDLC optical element 32.

The illuminating lights A incident on the reflection type spatial light modulator 20B in which the polarized state of each pixel of a display image is modulated in the reflection type spatial light modulator 20B are reflected and incident again on the HPDLC optical element 32. As the reflection type spatial light modulator 20B, for example, a liquid crystal may be used. The P polarized lights which are not modulated in the reflection type spatial light modulator 20B are diffracted again in the HPDLC optical element 32 and returned to the light source device 10 side. S polarized lights modulated in the reflection type spatial light modulator 20B are not diffracted in the HPDLC optical element 32 and pass through the HPDLC optical element 32 to become image display lights B. The image display lights B become intensity-modulated lights in which the intensity of each pixel of a display image is modulated. The image display lights B are internally reflected in the illuminating prism 31 and exit from the third surface of the illuminating prism 31.

An analyzer 33 is sandwiched in between the third surface of the illuminating prism 31 and the plane of incidence of the light guide prism 40. That is, the image display lights B outgoing from the third surface of the illuminating prism 31 pass through the analyzer 33 and are incident on the plane of incidence of the light guide prism 40. The image display lights B pass through the analyzer 33 so that only the polarized components of a prescribed direction are detected. The image display lights B are detected in the analyzer 33 so that the image display lights B become lights whose intensity is further adequately modulated.

The image display lights B incident on the light guide prism 40 are completely internally reflected several times in the light guide prism 40, and then, incident slantingly on the transmission type volume hologram optical element 51 which comes into optically tight contact with the light guide prism 40. The image display lights B incident on the transmission type volume hologram optical element 51 are diffracted by the transmission type volume hologram optical element 51 and incident on the reflection type volume hologram lens 71.

Since the reflection type volume hologram lens 71 has a positive optical power, the image display lights B are reflected by the reflection type volume hologram lens 71 to become virtual image display lights C forming a virtual image. Then, the image display lights are incident again on the transmission type volume hologram optical element 51.

At this time, the virtual image display lights C are incident on the transmission type volume hologram optical element 51 at an angle of incidence different from that of the image display lights B incident on the transmission type volume hologram optical element 51 from the light guide prism 40. Therefore, the virtual image display lights C are not diffracted due to the angle selectivity of the transmission type volume hologram optical element 51 and pass through the transmission type volume hologram optical element 51. The virtual image display lights C pass through the light guide prism 40 and reach the pupil 100 of an observer.

Here, the transmission type volume hologram optical element 51 has an effect of more increasing a quantity of eccentric aberration capable of being corrected than a case in which only the reflection type volume hologram lens 71 is employed. In other word, the transmission type volume hologram optical element 51 uniforms the angle of incidence of the image display lights B incident on the reflection type volume hologram lens 71 to increase the quantity of eccentric aberration capable of being corrected.

On the other hand, background lights D that reach the rear side of the reflection type volume hologram lens 71 pass through, as shown in FIG. 6, the polarizing plate 80, the reflection type volume hologram lens 71, the transmission type volume hologram optical element 51 and the light guide prism 40 and are incident on the pupil 100 of the observer. The background lights D are not polarized before the background lights D are incident on the polarizing plate 80. However, the background lights D pass through the polarizing plate 80, so that the lights become linearly polarized lights as the S polarized lights relative to the transmission type volume hologram optical element 51. In the transmission type volume hologram optical element 51, since the S polarized lights are hardly diffracted, the background lights D are not diffracted in the transmission type volume hologram optical element 51 and reach the pupil 100 of the observer. In this case, the quantity of light of the background lights D reaching the pupil 100 of the observer depends on a transmittance in the reflection type volume hologram lens 71 and the transmission type volume hologram optical element 51.

The polarizing plate 80 is rotated on an axis perpendicular to a main plane so that the quantity of light of the background lights D reaching the pupil 100 can be varied. Further, the polarizing plate 80 is rotated so that the penetrating lights of the polarizing plate 80 become the P polarized lights relative to the transmission type volume hologram optical element 51. Thus, the background lights D are diffracted toward the light source device 10 side in the transmission type volume hologram optical element 51. Accordingly, the quantity of light of the background lights D incident on the pupil 100 can be reduced.

In the image display device shown in FIG. 6, an adjustable curved face reflecting mirror (an adjustable curved face semi-transmission mirror) may be used in place of the reflection type volume hologram lens 71. Further, an HPDLC optical element may be used in place of the transmission type volume hologram optical element 51. In this case, the HPDLC optical element has diffraction efficiency with no dependence on the polarizing direction of an incident light flux and with a dependence on the angle of incidence of the incident light flux.

Figure 7:
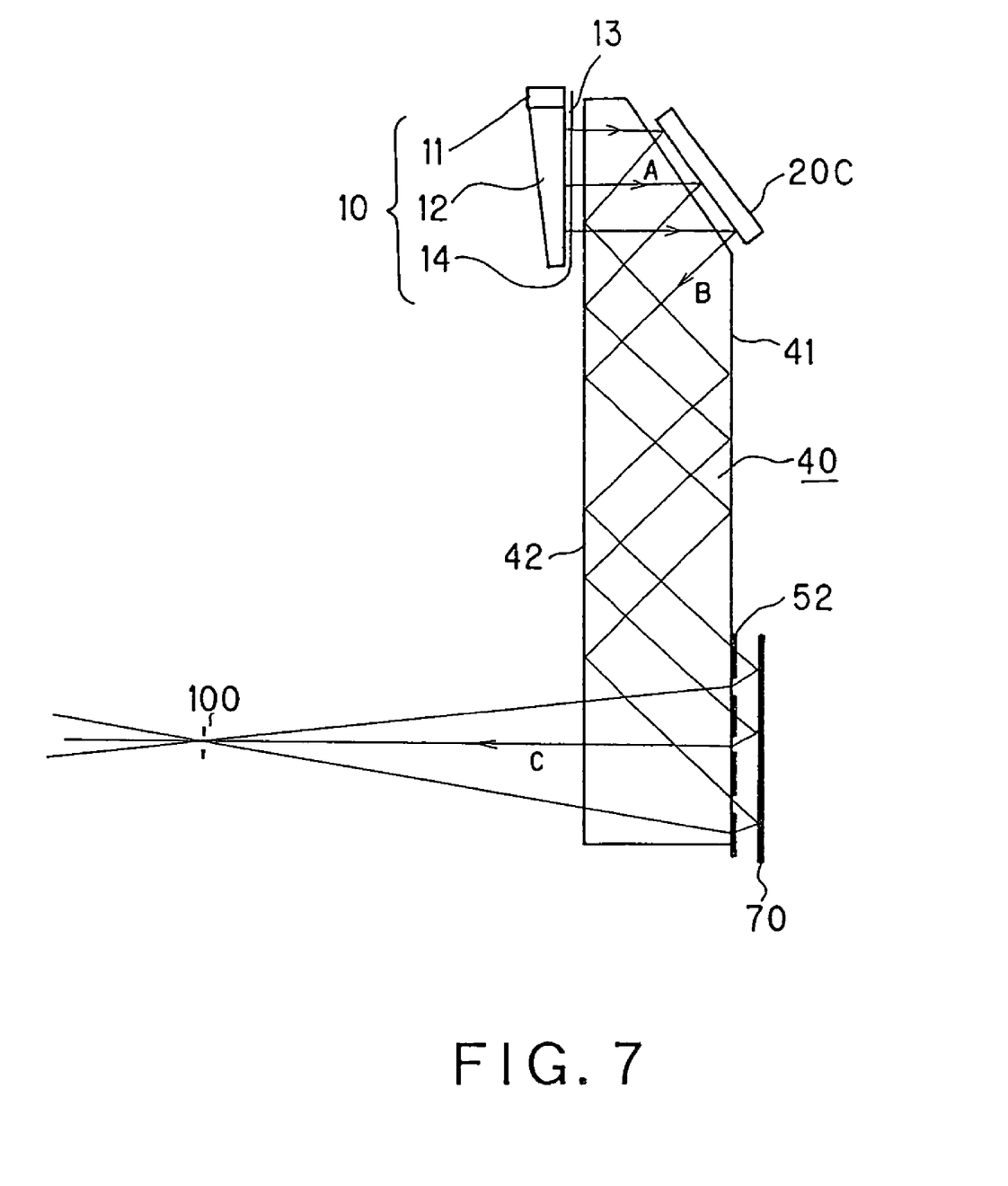
FIG. 7 is a side view showing a still another embodiment of an image display device according to the present invention.

In the image display device according to the present invention, an HPDLC optical element may not be used, as shown in FIG. 7. Illuminating lights A outgoing from an illuminating light source device 10 are allowed to pass through a light guide prism 40 and are directly slantingly incident on a reflection type spatial light modulator 20B. The image display device shown in FIG. 7 includes an illuminating light source device 10, a reflection type spatial light modulator (digital micromirror device) 20C, a light guide prism 40, a transmission type diffraction optical element 52 and a reflection type volume hologram lens 70.

The light source device 10 forming the image display device uses a semiconductor laser 11 as a light source like the above-described image display device. The light source device 10 includes a semiconductor laser 11, a light guide plate 12 for guiding a light flux emitted from the semiconductor laser 11 and an optical film 14. Lights emitted from the semiconductor laser 11 are incident on the light guide plate 12 made of a synthetic resin. The lights with illumination intensity uniformed and an angle of emergence controlled by the light guide plate 12 exit from an exit surface 13. Illuminating lights A outgoing from the exit surface 13 pass through the optical film 14 disposed in parallel with the exit surface 13. Thus, the angle of emergence of the lights is further controlled. A reflection sheet not shown in the drawing is provided on each surface of the light guide plate 12 except the exit surface 13.

Illuminating lights A passing through the optical film 14 pass through a side part of one end of the light guide prism 40 and are slantingly incident on the digital micromirror device 20C as the reflection type spatial light modulator. The digital micromirror device 20C has micromirrors corresponding to pixels of a display image and these mirrors can be respectively rotated. That is, in the digital micromirror device 20C, each mirror is rotated so that a reflecting direction relative to an incident light flux can be changed for each pixel.

The side part of one end of the light guide prism 40 is wedge shaped. The digital micromirror device 20C united to the outer surface of the side part of one end of the light guide prism 40 is inclined relative to the illuminating lights A emitted from the light source device 10.

The illuminating lights A incident on the digital micromirror device 20C whose reflected directions are controlled for each pixel by the digital micromirror device 20C are partly emitted substantially vertically from the digital micromirror device 20C as image display lights B correspondingly to the display image. Remaining parts of the illuminating lights A are reflected again to the light source device 10 side from the digital micromirror device 20C.

The image display lights B substantially vertically emitted from the digital micromirror device 20C are incident again on the light guide prism 40. The image display lights repeat alternately complete reflections several times in light flux split surfaces 41 and 42 as outer surfaces of the light guide prism 40 parallel to each other. Then, the image display lights are slantingly incident on the transmission type diffraction optical element 52 provided in optically tight contact with one surface of the light flux split surfaces 41 and 42. The transmission type diffraction optical element 52 is located at the other end side of the light guide prism 40 as shown in FIG. 7.

The image display lights B incident on the transmission type diffraction optical element 52 pass through the transmission type diffraction optical element 52 and are incident on the reflection type volume hologram lens 70 which comes into optically tight contact with the transmission type diffraction optical element 52. Since the reflection type volume hologram lens 70 has a positive optical power, the image display lights B are reflected by the reflection type volume hologram lens 70 to become a virtual image display lights C forming a virtual image. The image display lights are incident again on the transmission type diffraction optical element 52.

At this time, the virtual image display lights C are incident on the transmission type diffraction optical element 52 at an angle of incidence different from that of the image display lights B incident on the transmission type diffraction optical element 52 from the light guide prism 40. Therefore, the virtual image display lights C are diffracted due to the angle selectivity of the transmission type diffraction optical element 52 and pass through the transmission type diffraction optical element 52. The virtual image display lights C pass through the outer surface parts 41 and 42 of the light guide prism 40 and reach the pupil 100 of an observer.

Figure 8:
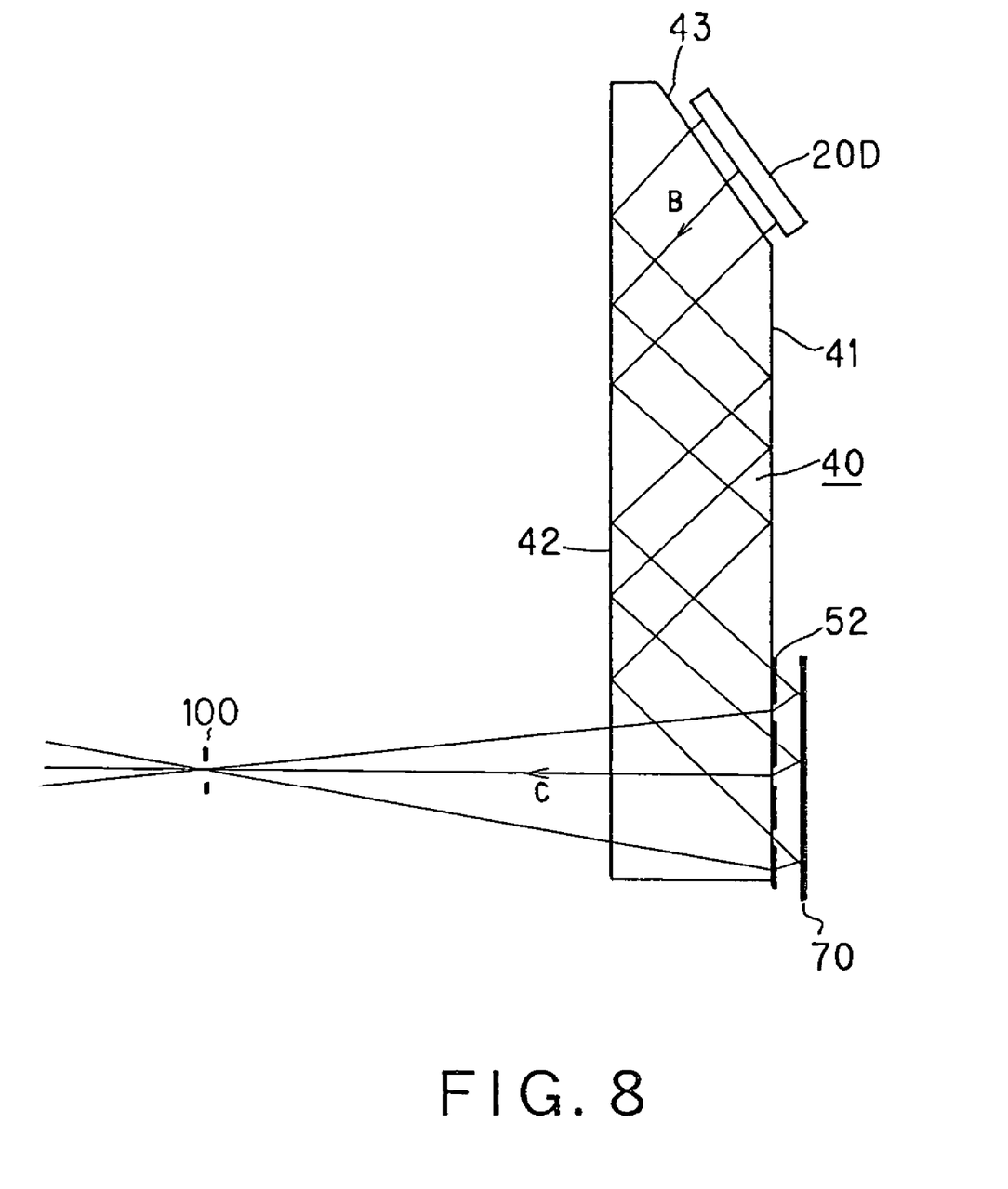
FIG. 8 is a side view showing other embodiment of an image display device according to the present invention.

The image display device according to the present invention may be further formed, as shown in FIG. 8, by using an emissive microdisplay 20D serving as a spatial light modulator, a light guide prism 40, a transmission type diffraction optical element 52 and a reflection type volume hologram lens 70.

The emissive microdisplay 20D shown in FIG. 8 has a light source contained therein to emit image display lights B in which an intensity modulation corresponding to a display image is performed. In the emissive microdisplay 20D, light emission intensity is controlled for each pixel and the image display lights B corresponding to the display image are substantially vertically emitted from the emissive microdisplay 20D.

The image display lights B emitted from the emissive microdisplay 20D are incident on the light guide prism 40 from the side part of one end of the light guide prism 40. The side part of one end of the light guide prism 40 is formed in a wedge shape. The emissive microdisplay 20D united to a plane of incidence 43 as the outer surface of the side part of one end of the light guide prism 40 is inclined relative to light flux split surfaces 41 and 42 as the outer surfaces of the light guide prism 40 parallel to each other.

The image display lights B substantially vertically emitted from the emissive microdisplay 20D are incident on the light guide prism 40. The image display lights repeat alternately complete internal reflections several times in the light flux split surfaces 41 and 42 as the outer surfaces of the light guide prism 40 parallel to each other. Then, the image display lights are slantingly incident on the transmission type diffraction optical element 52 provided in optically tight contact with one surface of the light flux split surfaces 41 and 42. The transmission type diffraction optical element 52 is located to come into optically tight contact with the other end side of the light guide prism 40.

The image display lights B incident on the transmission type diffraction optical element 52 pass through the transmission type diffraction optical element 52 and are incident on the reflection type volume hologram lens 70 which comes into optically tight contact with the transmission type diffraction optical element 52. Since the reflection type volume hologram lens 70 has a positive optical power, the image display lights B are reflected by the reflection type volume hologram lens 70 to become a virtual image display lights C forming a virtual image. The image display lights C are incident again on the transmission type diffraction optical element 52.

At this time, the virtual image display lights C are incident on the transmission type diffraction optical element 52 at an angle of incidence different from that of the image display lights B incident on the transmission type diffraction optical element 52 from the light guide prism 40. The virtual image display lights C are diffracted due to the angle selectivity of the transmission type diffraction optical element 52 and pass through the transmission type diffraction optical element 52. The virtual image display lights C pass through the light flux split surfaces 41 and 42 of the light guide prism 40 and reach the pupil 100 of an observer.

In the above-described embodiments, the image display lights are diffracted or not diffracted in the first transmission depending on the polarized direction or the angle of incidence, and the image display lights are not diffracted or diffracted in the second transmission toward the opposite direction in the HPDLC optical element 50, the transmission type volume hologram optical element 51 and the transmission type diffraction optical element 52. However, the above relations may be reversed, and the image display lights may not be diffracted or may be diffracted in the first transmission and the image display lights may be diffracted or may not be diffracted in the second transmission toward the opposite direction.

The present invention is not limited to the above-described embodiments explained with reference to the drawing. It is apparent for a person with ordinary skill in the art that various changes, substitutions or equivalence thereto may be made without departing the attached claims and the gist thereof.

INDUSTRIAL APPLICABILITY

The image display device according to the present invention employs a decentered optical system in which the image display element and the reflection type optical element having a positive optical power are optically eccentrically arranged. Thus, the entire optical system can be thinner and lighter than other optical systems having the same exit pupil diameter and the same display angle of view. Further, the image display device employs the decentered optical system, so that an optical system having higher resolving power can be realized by correcting the generated eccentric aberration by the transmission type diffraction optical element.

The use of the present invention makes it possible to realize the image display device in which the exit pupil diameter, the display angle of view and the eye relief can be increased and the aberration can be reduced while the entire device is made compact and light.

The invention claimed is:

1. An image display device comprising:
   an image display element;
   a transmission type diffraction optical element for diffracting exit lights from the image display element; and
   a reflection type optical element having a positive optical power for reflecting the diffracted lights from the transmission type diffraction optical element,
   wherein when the reflected lights reflected by the reflection type optical element having the positive optical power are incident again on the transmission type diffraction optical element, the transmission type diffraction optical element diffracts the reflected lights with a diffraction efficiency lower than a diffraction efficiency for the exit lights from the image display element.

2. The image display device according to claim 1, wherein the transmission type diffraction optical element receives chief rays of the exit lights from the image display element at an angle of incidence of 5° or more with respect to the normal of a light receiving surface.

3. The image display device according to claim 1, wherein the transmission type diffraction optical element is a volume type hologram optical element.

4. The image display device according to claim 1, wherein the transmission type diffraction optical element is composed of diffraction gratings disposed with uneven spaces.

5. The image display element according to claim 1, wherein the transmission type diffraction optical element is a polarization selective hologram optical element.

6. The image display device according to claim 5, wherein the polarization selective hologram optical element is a holographic polymer dispersed liquid crystal optical element.

7. The image display device according to claim 6, wherein the holographic polymer dispersed liquid crystal optical element has a P polarization diffraction efficiency higher than an S polarization diffraction efficiency.

8. The image display device according to claim 1, wherein the reflection type optical element having the positive optical power is a reflection type volume hologram optical element.

9. The image display device according to claim 1, wherein the reflection type optical element is a concave reflecting mirror and the reflection surface of the reflecting mirror is formed to have one plane of symmetry and no rotation symmetry axis inside and outside the plane.

10. The image display device according to claim 1, wherein the reflection type optical element having the positive optical power is made of a semi-transmission material for transmitting at least a part of lights from a rear surface side to a front surface side as a transmission type diffraction optical element side.

11. The image display device according to claim 1, wherein a quarter-wave plate is provided in an optical path between the transmission type diffraction optical element and the reflection type optical element having the positive optical power.

12. The image display device according to claim 1, wherein an optical medium having a refractive index larger than 1 is arranged in the optical path between the image display element and the transmission type diffraction optical element.

13. The image display device according to claim 12, wherein the exit lights from the image display element are internally reflected at least one or more times in the optical medium, and then, incident on the transmission type diffraction optical element.

14. The image display device according to claim 1, wherein the transmission type diffraction optical element optically comes into contact with the reflection type optical element.

15. The image display device according to claim 10, wherein the transmission type diffraction optical element is a polarization selective hologram optical element and a polarizing plate is disposed in the rear surface side of a plane of the reflection type optical element on which the diffracted lights are incident.

16. The image display device according to claim 15, wherein the polarizing plate is arranged to mainly transmit the lights with such a polarizing orientation as to make minimum the diffraction efficiency of the transmission type diffraction optical element.

17. The image display device according to claim 15, wherein the polarizing plate can rotate on an axis substantially vertical to a light receiving surface.

18. The image display device according to claim 10, wherein a first polarizing plate, the quarter-wave plate and a second polarizing plate are sequentially arranged in the rear surface side of the plane of the reflection type optical element on which the diffracted lights are incident.

19. The image display device according to claim 18, wherein at least one of the quarter-wave plate and the polarizing plates can respectively rotate on axes substantially vertical to their light receiving surfaces.

20. An image display device comprising:
    an image display element;
    a transmission type diffraction optical element for receiving exit lights from the image display element; and
    a reflection type optical element having a positive optical power for reflecting the exit lights from the image display element which pass through the transmission type diffraction optical element without being diffracted in the transmission type diffraction optical element,
    wherein when the reflected lights reflected by the reflection type optical element having the positive optical power are incident again on the transmission type diffraction optical element, the transmission type diffraction optical element diffracts the reflected lights with a diffraction efficiency higher than a diffraction efficiency for the exit lights from the image display element.

21. The image display device according to claim 20, wherein the transmission type diffraction optical element receives chief rays of the exit lights from the image display element at an angle of incidence of 5° or more with respect to the normal of a light receiving surface.

22. The image display device according to claim 20, wherein the transmission type diffraction optical element is a volume type hologram optical element.

23. The image display device according to claim 20, wherein the transmission type diffraction optical element is composed of diffraction gratings disposed with uneven spaces.

24. The image display element according to claim 20, wherein the transmission type diffraction optical element is a polarization selective hologram optical element.

25. The image display device according to claim 24, wherein the polarization selective hologram optical element is a holographic polymer dispersed liquid crystal optical element.

26. The image display device according to claim 25, wherein the holographic polymer dispersed liquid crystal optical element has a P polarization diffraction efficiency higher than an S polarization diffraction efficiency.

27. The image display device according to claim 20, wherein the reflection type optical element having the positive optical power is a reflection type volume hologram optical element.

28. The image display device according to claim 20, wherein the reflection type optical element having the positive optical power is a concave reflecting mirror and the reflection surface of the reflecting mirror is formed to have one plane of symmetry and no rotation symmetry axis inside and outside the plane.

29. The image display device according to claim 20, wherein the reflection type optical element having the positive optical power is made of a semi-transmission material for transmitting at least a part of lights from a rear surface side to a front surface side as a transmission type diffraction optical element side.

30. The image display device according to claim 20, wherein a quarter-wave plate is provided in an optical path between the transmission type diffraction optical element and the reflection type optical element having the positive optical power.

31. The image display device according to claim 20, wherein an optical medium having a refractive index larger than 1 is arranged in the optical path between the image display element and the transmission type diffraction optical element.

32. The image display device according to claim 31, wherein the exit lights from the image display element are internally reflected at least one or more times in the optical medium, and then, incident on the transmission type diffraction optical element.

33. The image display device according to claim 20, wherein the transmission type diffraction optical element optically comes into contact with the reflection type optical element.

34. The image display device according to claim 29, wherein the transmission type diffraction optical element is a polarization selective hologram optical element and a polarizing plate is disposed in the rear surface side of a plane of the reflection optical element on which the diffracted lights are incident.

35. The image display device according to claim 34, wherein the polarizing plate is arranged to mainly transmit the lights with such a polarizing orientation as to make minimum the diffraction efficiency of the transmission type diffraction optical element.

36. The image display device according to claim 34, wherein the polarizing plate can rotate on an axis substantially vertical to a light receiving surface.

37. The image display device according to claim 29, wherein a first polarizing plate, the quarter-wave plate and a second polarizing plate are sequentially arranged in the rear surface side of the plane of the reflection type optical element on which the diffracted lights are incident.

38. The image display device according to claim 37, wherein at least one of the quarter-wave plate and the polarizing plates can respectively rotate on axes substantially vertical to their light receiving surfaces.

* * * * *